(12) United States Patent
Fäth et al.

(10) Patent No.: US 11,353,082 B2
(45) Date of Patent: Jun. 7, 2022

(54) CLOSURE DEVICE, USE OF A CLOSURE DEVICE, METHOD FOR SEALING A FLUID CHANNEL, AND AIR SPRING SYSTEM

(71) Applicant: SAF-HOLLAND GmbH, Bessenbach (DE)

(72) Inventors: Stefan Fäth, Aschaffenburg (DE); Stefan Wallmeier, Goldbach (DE); Kerstin Bonness, Aschaffenburg (DE)

(73) Assignee: SAF-Holland GmbH, Bessenbach (DE)

( * ) Notice: Subject to any disclaimer, the term of this patent is extended or adjusted under 35 U.S.C. 154(b) by 202 days.

(21) Appl. No.: 16/611,133

(22) PCT Filed: May 8, 2018

(86) PCT No.: PCT/EP2018/061830
§ 371 (c)(1),
(2) Date: Nov. 5, 2019

(87) PCT Pub. No.: WO2018/206558
PCT Pub. Date: Nov. 15, 2018

(65) Prior Publication Data
US 2020/0191226 A1  Jun. 18, 2020

(30) Foreign Application Priority Data
May 8, 2017 (DE) .................... 10 2017 109 808.9

(51) Int. Cl.
*F16F 9/02* (2006.01)
(52) U.S. Cl.
CPC ................................ *F16F 9/0281* (2013.01)

(58) Field of Classification Search
CPC .......... F16F 9/0281; F16F 9/04; F16F 9/0472; F16F 9/0481; F16F 9/05; F16F 9/068; F16F 9/34; F16F 9/3415; F16F 9/348; F16F 9/516
See application file for complete search history.

(56) References Cited

U.S. PATENT DOCUMENTS

| 3,109,552 A | 11/1963 | Miller |
| 3,266,095 A | 8/1966 | Levey, Jr. et al. |
| 3,365,093 A | 1/1968 | Malenke |
| 3,876,193 A * | 4/1975 | Clary ...................... F16F 9/437 267/64.16 |
| 4,569,803 A * | 2/1986 | Takakura ............. F02M 19/122 251/48 |

(Continued)

FOREIGN PATENT DOCUMENTS

| CN | 104455905 A | 3/2015 |
| DE | 1151189 B | 4/1959 |

(Continued)

OTHER PUBLICATIONS

European Patent Office; International Search Report; dated Aug. 20, 2018.

*Primary Examiner* — Pamela Rodriguez
(74) *Attorney, Agent, or Firm* — Price Heneveld LLP

(57) ABSTRACT

A closure device for an air spring system that includes an auxiliary vessel and an air spring device attachable to a link for an air spring system of a utility vehicle, wherein the closure device, in the installed state, seals off a fluid channel for gas exchange between the air spring device and the auxiliary vessel.

18 Claims, 8 Drawing Sheets

(56) References Cited

U.S. PATENT DOCUMENTS

| | | | |
|---|---|---|---|
| 5,326,082 A | 7/1994 | Ecktman et al. | |
| 6,056,277 A * | 5/2000 | Wode | B60G 17/0432 267/124 |
| 8,998,184 B2 * | 4/2015 | Buttner | F16F 9/052 267/64.27 |
| 9,849,745 B2 * | 12/2017 | Fulton | F16F 9/04 |
| 2013/0056917 A1 * | 3/2013 | Buttner | F16F 9/43 267/64.27 |
| 2015/0014498 A1 * | 1/2015 | Hock | B60G 11/27 248/205.1 |

FOREIGN PATENT DOCUMENTS

| | | |
|---|---|---|
| DE | 102004011466 A1 | 10/2004 |
| DE | 102006030452 A1 | 1/2008 |
| DE | 10 2010 0288 10 A1 | 11/2011 |
| DE | 102012201745 | 8/2013 |
| DE | 102014008121 | 12/2015 |
| EP | 0864452 A2 | 9/1998 |
| EP | 2539603 A1 | 1/2013 |
| KR | 20100099525 A | 9/2010 |
| WO | 2012145451 A1 | 10/2012 |

* cited by examiner

CLOSURE DEVICE, USE OF A CLOSURE DEVICE, METHOD FOR SEALING A FLUID CHANNEL, AND AIR SPRING SYSTEM

BACKGROUND OF THE INVENTION

The present invention relates to a closure device, to the use of a closure device, to a method for sealing a fluid channel, and to an air spring system.

Air spring systems are well known from the prior art. They are typically used for the suspension of a vehicle axle or for varying a ride height of a vehicle. Common constituent parts of the air spring system are a piston and an air bellows, wherein the air bellows and the piston are displaceable relative to one another. Here, the air bellows rolls on an outer surface of the piston during spring compression and spring extension movements. For this purpose, the air bellows is preferably manufactured from an elastic material, by means of which a folding movement can be effected during the rolling action. Damping is furthermore effected by virtue of a fluid, in particular air, flowing back and forth via a narrowed cross section between a working space, which is provided by the air bellows and the piston, and a chamber formed in the piston. Owing to the narrowed cross section and the associated friction, the introduced vibrations are dampened.

The damping characteristics of an air spring device of said type are dependent on the available air volume. To increase the volume, it is therefore known for the working space to be connected to an auxiliary volume in the form of a separate auxiliary vessel. From the prior art, for example from document DE 10 2004 011 466 A1, an air spring system is known whose piston is connected via a connecting channel to an auxiliary volume vessel.

However, for such air spring systems, it has proven to be a disadvantage that, in the event of damage to the auxiliary vessel, a malfunction of the air spring system occurs owing to outflowing air, which malfunction can even jeopardize onward travel of the vehicle that comprises the air spring system.

It is therefore an object of the present invention to provide a device which can, at least for a short period of time, ensure onward travel in the event of a malfunction of the air spring system.

SUMMARY OF THE INVENTION

According to the invention, a closure device is provided for an air spring system which has an auxiliary vessel and an air spring device attachable to a link, in particular for an air spring system of a utility vehicle, wherein the closure device, in the installed state, seals off a fluid channel for gas exchange between the air spring device and the auxiliary vessel. By means of the closure device, it is possible in particular for the air spring device to be temporarily sealed off with respect to the auxiliary vessel, such that a vehicle equipped with the air spring system can travel to a workshop or to a servicing point if, for example, the auxiliary vessel is damaged, in particular has a leak. Here, the closure device seals off the air spring device such that no gas exchange is possible between the air spring device and the auxiliary vessel, and the air spring device is reduced to its basic function, in which the damping characteristics cannot be influenced by means of an auxiliary volume of the air from the auxiliary vessel. In particular, the air spring system is provided for a vehicle axle, wherein the link is arrangeable pivotably on a vehicle frame and is intended for supporting the vehicle axle. The air spring device arranged between the link and the vehicle frame comprises, for example, a piston and an air bellows. Said air bellows preferably has an elastically deformable cylindrical shell, which is connected at one side to the piston, for example by means of a clamping ring, and at the other side to the vehicle frame. During a cushioning movement, a working volume which is enclosed by the piston and the air bellows, and in which a fluid, in particular air, is collected, is reduced. Furthermore, the air can escape from the working volume through a cross section in the piston, whereby a damping effect can be achieved for the air spring and thus for a pivoting movement of the link element with the supported vehicle axle. It is furthermore conceivable that the closure device is reversibly fastenable to the link or to the vehicle frame in order to enable the closure device to be used, as required, for sealing off the air spring device. In this way, the closure device can advantageously be reused. In particular, provision is made whereby the air spring device is attached on a top side, facing toward the vehicle frame in the installed state, of the link, and the auxiliary vessel is attached on the bottom side, averted from the vehicle frame, of the link. Provision is furthermore made whereby the closure device is adapted with regard to the shape of the fluid channel, that is to say is dimensioned such that filling of the fluid channel, or coverage, is possible in the mounted state.

According to a further embodiment of the present invention, provision is made whereby the closure device, in the installed state, is arranged in an interface region, in which the air spring device is attached to the link. In particular, the air spring device, the link and the auxiliary vessel adjoin one another in the interface region, and the fluid channel runs through the interface region. The interface region is then advantageously particularly easily accessible for insertion of the closure device, because, in the event of insertion, it is merely necessary for the air spring device to be detached from the link in the interface region, and access to the fluid channel is then immediately available to the user.

Provision is expediently made whereby the closure device, in the installed state, is fixable in positively locking and/or frictionally locking fashion to the auxiliary vessel, to the link and/or to the air spring device, in particular along a direction running parallel to a longitudinal axis of the fluid channel. In this way, the closure device can be advantageously inserted without the use of an additional tool. For example, the closure device is designed such that it can be pressed into the fluid channel or lies on an opening of the fluid channel, in particular on an edge delimiting the opening. It is also conceivable for the closure device and the fluid channel to each have threads, by means of which the closure device can be attached to the fluid channel.

In a further embodiment of the present invention, provision is made whereby the closure device, in the installed state, at least partially fills the fluid channel. The closure device preferably fills the fluid channel by more than 50%. It is also conceivable for the closure device to fill the fluid channel completely.

Provision is preferably made whereby the closure device comprises a bolt which, in the installed state, seals off the air spring device by means of one end and is supported on the auxiliary vessel by means of another end. Such a bolt can be introduced without great effort into the fluid channel, and the length of said bolt in the direction running parallel to the longitudinal extent of the fluid channel ensures that the bolt does not slip out of the fluid channel. In order to prevent jamming of the bolt in the event of any displacement of the link, the bolt has a rounded end side on its side facing toward the inner side of the auxiliary vessel. It is furthermore conceivable for the bolt to be manufactured from, or encased by, an elastically deformable material. In this way, the bolt can be advantageously jammed or pressed into the fluid channel in the installed state.

In a further embodiment of the present invention, provision is made whereby the closure device is designed such that, in a first state, in a section plane, it has a first cross section and, in a second state, it has a second cross section enlarged in relation to the first cross section. In this way, not only is it possible to use a particularly compact and thus easy-to-carry closure device, but also, a closure device of said type can be used independently of the size of the auxiliary vessel. In this way, such a closure device can be used for different auxiliary vessels. Here, provision is preferably made whereby the closure device is inserted in the first state into the fluid channel, and then the closure device arranged in the fluid channel is transferred into the second state in order to fix the closure device.

It is preferable for a deformable filling element and a fixing element to be provided as closure device, wherein the filling element can be transferred by means of the fixing element from the first state into the second state. For this purpose, the fixing element preferably compresses the filling element. The filling element is for example a rubber element which is arranged between two parts, which are displaceable relative to one another, of the fixing element. For the transfer, the displaceable parts are moved toward one another, whereupon the filling element arranged between the displaceable parts is pressed outward. The outwardly pressed filling element then interacts in frictionally locking fashion with the inner side of the fluid channel and thus seals off the fluid channel.

In a further embodiment of the present invention, provision is made whereby the closure device is a covering element, in particular a closure cap or a plug, which is arrangeable, at an air spring device side, on an opening of the fluid channel between the air spring device and the auxiliary vessel. By means of the arrangement at the air spring device side, a positive pressure prevailing in the air spring device can be utilized to ensure that the covering element or the cap does not depart from its sealing position during operation. It is also conceivable that the covering element has an encircling collar which, in the installed state, lies on an edge delimiting the opening of the fluid channel, and positive locking is thus realized between the fluid channel and the covering element along a direction running parallel to the longitudinal axis of the fluid channel.

In a further embodiment of the present invention, provision is made whereby the closure device is a covering element, in particular a closure cap or a plug, which is arrangeable, at an auxiliary vessel side, on an opening of the fluid channel between the air spring device and the auxiliary vessel and is fixable by means of a deformable filling element. In order to prevent the covering element from falling out of the fluid channel, provision is preferably made whereby the covering element is fixed to the filling element, in particular at the inner side of the fluid channel.

A further subject of the present invention is the use of a closure device according to the invention in the event of a malfunction of the auxiliary vessel and/or of the air spring device. A malfunction is in particular an escape of the air from the auxiliary vessel. All features described for the closure device according to the invention, and the advantages thereof, can likewise be transferred analogously to the use according to the invention, and vice versa.

A further subject of the present invention is a method for sealing a fluid channel between an air spring device and an auxiliary vessel, wherein, in the event of a failure of an auxiliary vessel and/or of the air spring device, the air spring device is sealed off with respect to the auxiliary vessel by means of a closure device. All features described for the closure device according to the invention, and the advantages thereof, can likewise be transferred analogously to the method according to the invention, and vice versa.

A failure of the auxiliary vessel and/or of the air spring device is understood by a person skilled in the art for example to mean an escape of gas from the auxiliary vessel. Furthermore, provision is preferably made whereby the gas pressure in the auxiliary vessel is monitored, a user of the air spring system is made aware of a gas pressure loss, and the fluid channel is finally closed by means of the closure device.

A further subject of the present invention is an air spring system, in particular for a utility vehicle, comprising: an air spring device, a link and an auxiliary volume, wherein a closure device, in particular a closure device according to the invention, seals off a fluid channel between the air spring device and the auxiliary vessel. Here, a person skilled in the art understands sealing to mean that no gas exchange can take place via the fluid channel. In this way, in a situation in which gas escapes from the auxiliary vessel to the outside, the complete failure of the air spring device is prevented. In particular, provision is made whereby, to install the closure device, the air spring device or the auxiliary vessel are detached from the link and, subsequently, the closure device which seals off the fluid channel is mounted. After the mounting of the closure device, the air spring device or the auxiliary vessel is attached to the link again. All features described for the closure device according to the invention, and the advantages thereof, can likewise be transferred analogously to the air spring system according to the invention, and vice versa.

In particular, the closure device has a first part and a second part, wherein the closure device is fastened by means of the first part to the link, to the auxiliary reservoir and/or to the air spring device and, for the sealing of the fluid channel, the second part is pivotable relative to the first part. In this way, for the transfer into the installed state of the closure device, the second part can be pivoted relative to the first part. For example, the closure device is designed in the manner of a tank lid and can be pivoted in order to seal off the fluid channel. It is also conceivable for the second part to be displaceable, in particular in the manner of a sliding door. It is also conceivable that the first part forms a type of rail system, which is provided for the guidance of the second part and by means of which the second part can be offset to the side or laterally. The first part is preferably formed in the vicinity of or immediately adjacent to the fluid channel. It is furthermore conceivable that the first part and the second part are connected to one another by means of a hinge element. Here, the hinge element may also comprise a deformable connecting web which, in the installed state of the closure device, that is to say when the closure device seals off the fluid channel, forms a loop. The attachment of the first part to the closure device or to the auxiliary reservoir has the advantage that the closure element can be carried along directly at its location of use even during normal operation.

The closure device preferably comprises a sealing element, in particular in the region that interacts with the fluid channel in the installed state. For example, the closure device has an encircling sealing ring. It is however also conceivable for the closure device to have multiple sealing rings oriented parallel to one another, which are arranged in encircling fashion on the outer side of that part of the closure device which projects into the fluid channel in the installed state.

In particular, the closure device is designed such that it can change its cross section at least in certain regions. For example, an outer circumference of the closure device can change when it projects into the fluid channel. It would for example be conceivable for the closure device to comprise a spreading apparatus, by means of which the cross section of the closure device can be enlarged in a radial direction after the closure device has been pushed into the fluid channel. In this way, the closure device can be utilized universally for different fluid channels with different inner diameters, and the closure device can still be utilized even if the fluid channel has been slightly deformed.

Provision is furthermore made whereby the auxiliary reservoir, the air spring element and/or the link comprises a fastening region in which the closure device can be stowed during normal operation. For example, a corresponding recess is provided in the outer wall of the auxiliary reservoir, of the link and/or of the air spring device. The recess is particularly preferably formed between the air spring device and the link or between the auxiliary reservoir and the link. In this way, access to the closure device is provided as soon as the air spring device or the auxiliary reservoir is detached from the link. At the same time, the closure device is arranged in a protected manner during normal operation, that is to say when no closure of the fluid channel is necessary.

In a preferred embodiment of the present invention, provision is made whereby the air spring system is designed such that, in the event of locking of the air spring device, an engagement element can be introduced into a receiving region and, by means of an offset movement along an offset direction, the engagement element can be transferred from the receiving region into a positive-locking region, in which the engagement element interacts in positively locking fashion with a positive-locking element along a positive-locking direction which differs from the offset direction. In particular, the air spring device is attached to the link by means of a bayonet fastening. This permits fast and uncomplicated detachment of the air spring device in order to fit the closure device as required. For example, the engagement elements are provided as a hook element on the air spring device, and apertures are provided in the link as receiving region. In particular, the engagement elements, in the mounted state, engage behind a region of the link, wherein said region forms the positive-locking element.

BRIEF DESCRIPTION OF THE DRAWINGS

Further advantages and features will emerge from the following description of preferred embodiments of the subject matter according to the invention with reference to the appended figures. Here, individual features of the individual embodiments may be combined with one another within the scope of the invention.

In the figures.

DETAILED DESCRIPTION OF THE PREFERRED EMBODIMENTS

Figure 1:
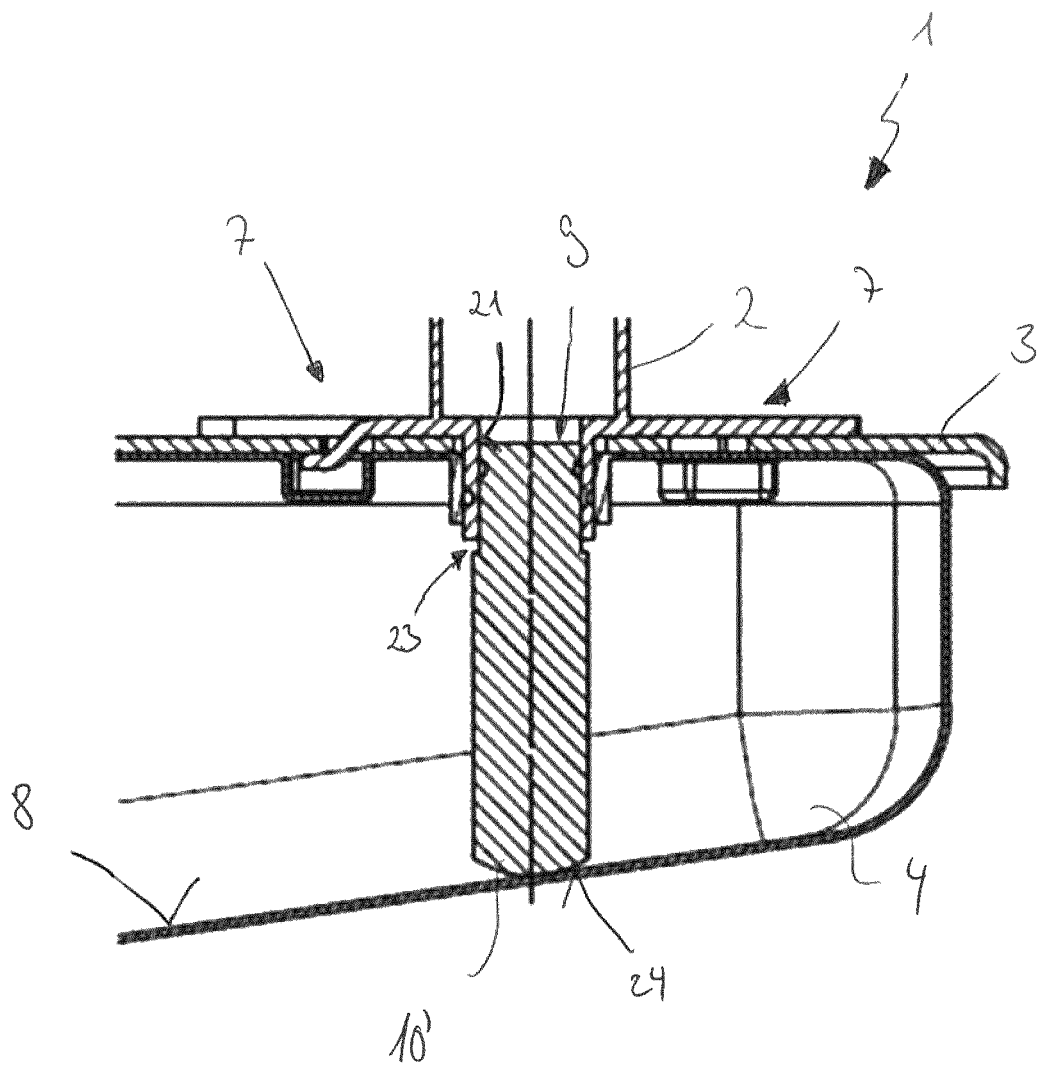
FIG. 1 shows an air spring system according to a first preferred embodiment of the present invention.

FIG. 1 illustrates an air spring system 1 according to a first preferred embodiment of the present invention. This is in particular an air spring system 1 which is provided for the suspension of a wheel axle on a utility vehicle, for example a semitrailer. Major constituent parts of an air spring system 1 of said type are a link 3, an auxiliary vessel 4 and an air spring device 2. It is preferable if the link 3 is attached, for example at one end thereof, to a vehicle body so as to be pivotable about a pivot axis, and bears the wheel axle. For the damping of a translational movement, for example an up-and-down movement, of the wheel axle during operation, the link 3 is attached by means of the air spring device 2 to a further region, spaced apart from the pivot axis, of the vehicle body. Aside from the suspension of a vehicle axle, the air spring system 1 is also used for varying a ride height of a vehicle. Here, major constituent parts of the air spring device 2 are preferably a piston and an air bellows, wherein the air bellows and the piston are displaceable relative to one another. Here, the air bellows rolls on an outer surface of the piston during spring compression and spring extension movements. For this purpose, the air bellows is preferably manufactured from an elastic material, by means of which a folding movement can be effected during the rolling action. Damping is furthermore effected by virtue of a fluid, in particular air, flowing back and forth via a narrowed cross section between a working space, which is provided by the air bellows and the piston, and a chamber formed in the piston. Owing to the narrowed cross section and the associated friction, the introduced vibrations are dampened.

The damping characteristics of an air spring device 2 of said type are dependent on the available air volume. To increase the volume, it is therefore known for the working space to be connected to an auxiliary vessel 4, which provides an auxiliary volume 4. In particular, the auxiliary vessel 4 and the air spring device 2 are fluidically connected via a fluid channel 9 which, during normal operation, that is to say in the case of a functional auxiliary vessel 4 or a functional air spring device 2, permits an exchange of gas between the auxiliary vessel and the air spring device. In the embodiment illustrated, the link 3 is arranged between the auxiliary vessel 4 and the air spring device 2. Preferably, the air spring device 2 is attached in an interface region 7 to the link 3, wherein, in the interface region 7, the fluid channel 9 extends through the link 3 and connects the air spring device 2 to the auxiliary vessel 4.

In order to be able to ensure onward travel of the vehicle even if, in a malfunction operating situation, the auxiliary vessel 4 and/or the air spring device 2 is defective or malfunctioning, a closure device 10', 10", 10''', 10'''' is provided which, in the installed state, seals off the air spring device 2 with respect to the auxiliary vessel 4 and the fluid channel 9. In particular, the closure device 10', 10", 10''', 10'''' blocks the gas exchange between the air spring device 2 and the auxiliary vessel 4. In the embodiment from FIG. 1, the closure device 10', 10", 10''', 10'''' is a bolt 10' which, in the installed state, fills the fluid channel 9 by means of one end and is supported on an inner side 8 of the auxiliary vessel 4 by means of the other end. In the event of a malfunction of the auxiliary vessel 4 and/or of the air spring device 2, provision is made whereby the air spring device 2 is, for a short period of time, dismounted from the link 3, fitted with the closure device 10', 10", 10''', 10'''' and subsequently connected to the link 3 again. Here, the bolt 10' is dimensioned such that it can, by means of its end which fills the fluid channel 9, be inserted in an accurately fitting manner, preferably with an interference fit, into the fluid channel 9, and is dimensioned to be of such a length that it can be supported on the auxiliary vessel 4, in particular on the inner side 8 thereof. Provision is furthermore made whereby the bolt 10' has a shoulder 23 which prevents the bolt 10' from inadvertently being pushed too far into the air spring device 2. Provision is particularly preferably made whereby the bolt 10' has, at its supporting end, a rounded end side 24 which permits uniform support of the bolt 10' irrespective of the present orientation of the inner side 8 of the auxiliary vessel 4. To simplify an insertion of the bolt 10' into the fluid channel 9, provision is preferably made whereby the bolt 10' interacts in frictionally locking fashion with the fluid channel 9, in particular with an inner side 21 of the fluid channel 9. In particular, provision is made whereby the closure device 10', 10", 10''', 10'''' is provided for temporary use, and is for example easy to remove again once the vehicle has reached a workshop or a servicing facility.

Figures 2A, 2B:
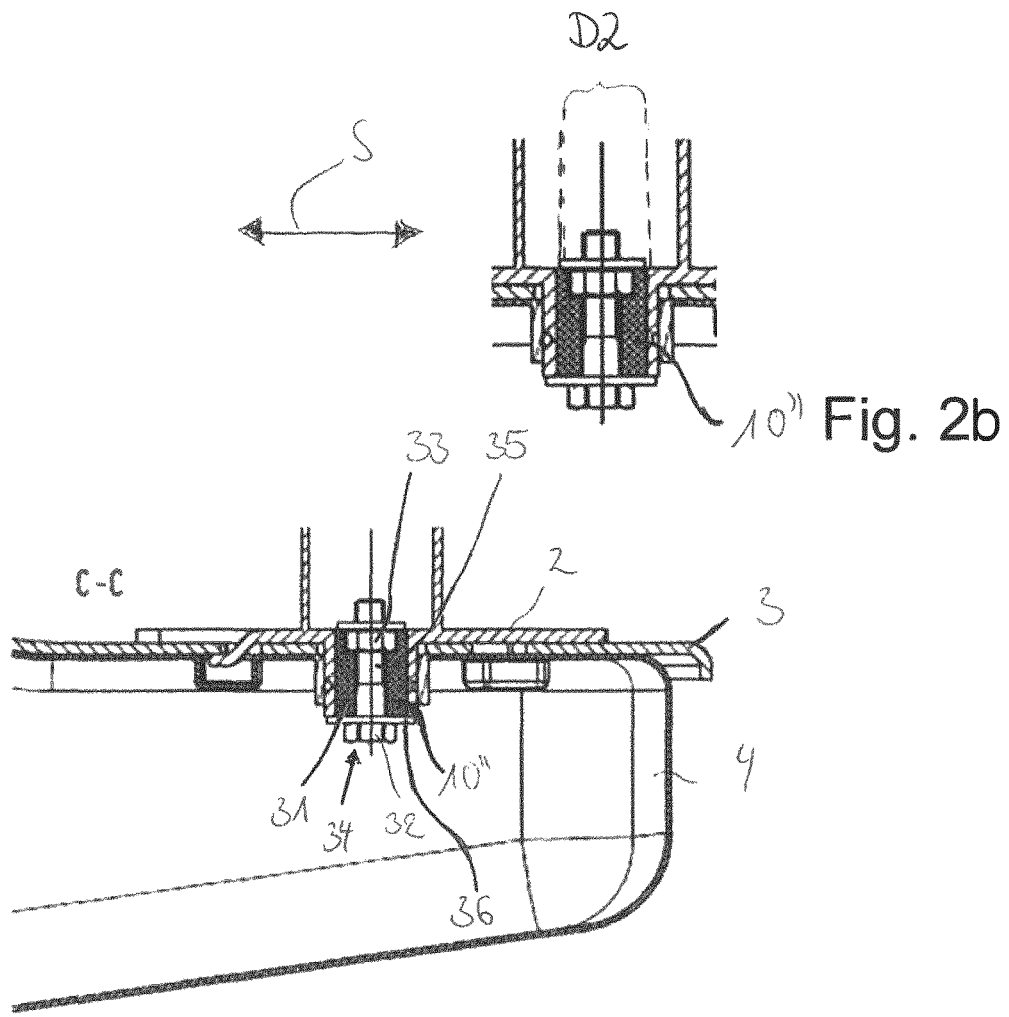
FIGS. 2a and 2b show an air spring system according to a second preferred embodiment of the present invention.

FIGS. 2a and 2b illustrate a second preferred embodiment of the air spring system 1 according to the present invention. Here, the closure device 10', 10", 10''', 10'''' differs from that from FIG. 1 in that, instead of a bolt 10', a closure system 10" composed of a deformable filling element 31 and of a fixing element 34, which comprises for example a screw 32 and a nut 33, is used as closure device 10', 10", 10''', 10''''. Here, the deformable filling element 31, for example a rubber element, has, in a first state, a first cross section and, in a second state, a second cross section D2 enlarged in relation to the first cross section. The first cross section and the second cross section D2 are preferably measured in a section plane S extending perpendicular to the longitudinal direction of the fluid channel. In the present case, the screw 32 and the nut 33 are actuated such that a spacing between a screw head of the screw 32 and the nut 33 is decreased during the transfer into the second state and, in the process, the deformed filling element 31, which encases a screw shank 35 in the manner of a collar, is pressed radially outward in relation to an axis predefined by the longitudinal axis of the fluid channel 9. Consequently, as a result of the increase of the cross section, the deformable filling element 31 becomes jammed with the inner side 21 of the fluid channel 9 and thus seals off the air spring device 2 with respect to the auxiliary vessel 4. Here, the closure device 10', 10", 10''', 10'''' is fixed by means of the deformable filling element 31 to the fluid channel 9 of the air spring device 2. To simplify the fitting of the closure device 10', 10", 10''', 10'''', a washer 36 is provided, the diameter of which in the section plane S is greater than an inner diameter of the fluid channel 9, such that the closure device 10', 10", 10''', 10'''' can advantageously be supported by means of the washer 36 during the mounting process.

Figures 3A, 3B:
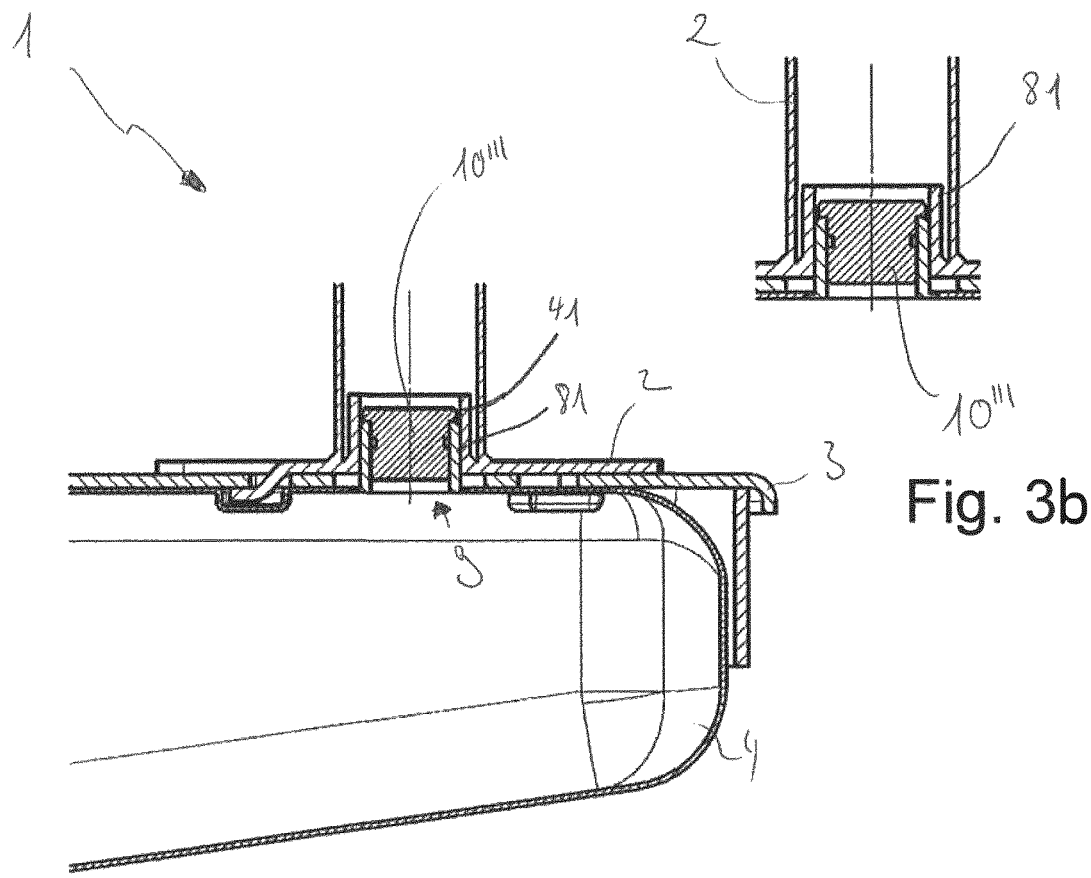
FIGS. 3a and 3b show an air spring system according to a third preferred embodiment of the present invention.

FIGS. 3a and 3b illustrate an air spring system 1 according to a third preferred embodiment of the present invention. In this embodiment, the closure device 10', 10", 10''', 10'''' comprises a closure cap 10''', in particular a plug, which closes the fluid channel 9 at the air spring device side. For this purpose, the plug comprises an encircling collar 41, the diameter of which in the section plane S is greater than the inner diameter of the fluid channel 9. Said collar lies, in the installed state, on an edge 81 of the fluid channel 9, wherein the edge 81 defines an opening of the fluid channel 9 at the air spring device side. Owing to the positive pressure prevailing in the air spring device 2, the plug is advantageously fixed in its position at the opening to the fluid channel 9 and thus seals off the latter.

Figure 4B:
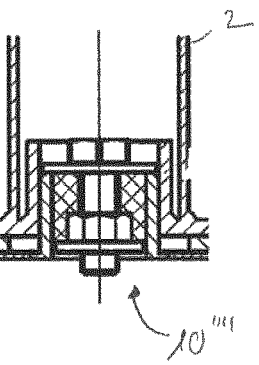
FIGS. 4a and 4b show an air spring system according to a fourth preferred embodiment of the present invention.
Figure 4A:
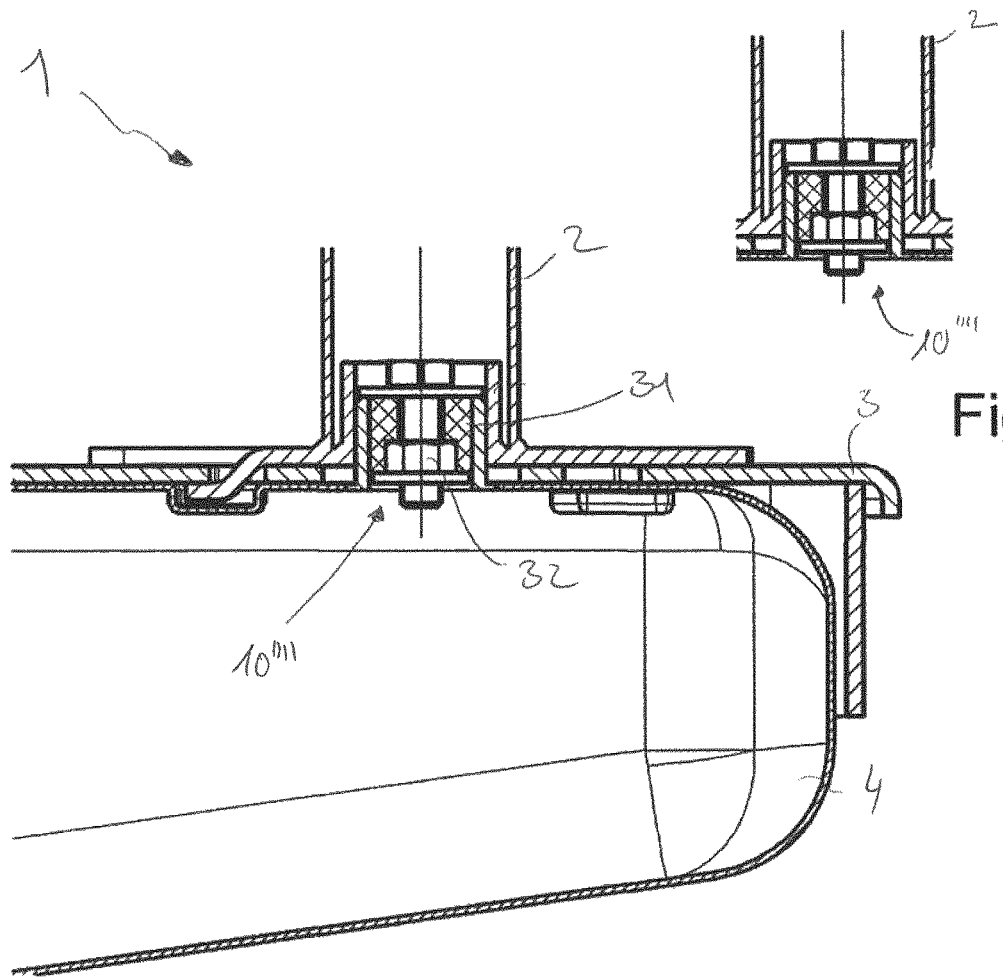

FIGS. 4a and 4b illustrate an air spring system 1 according to a fourth preferred embodiment of the present invention. As in the embodiment from FIG. 3, the closure device 10', 10", 10''', 10'''' is in this case a further closure cap 10'''' which, in the installed state, is arranged for example within the fluid channel 9. By contrast to the embodiment from FIG. 3, the further closure cap 10'''' illustrated here is arranged at the auxiliary vessel side. To prevent said further closure cap from slipping or being pressed out of the fluid channel 9, an additional fixing mechanism, as described in the embodiment from FIG. 2, is provided.

Figure 5A:
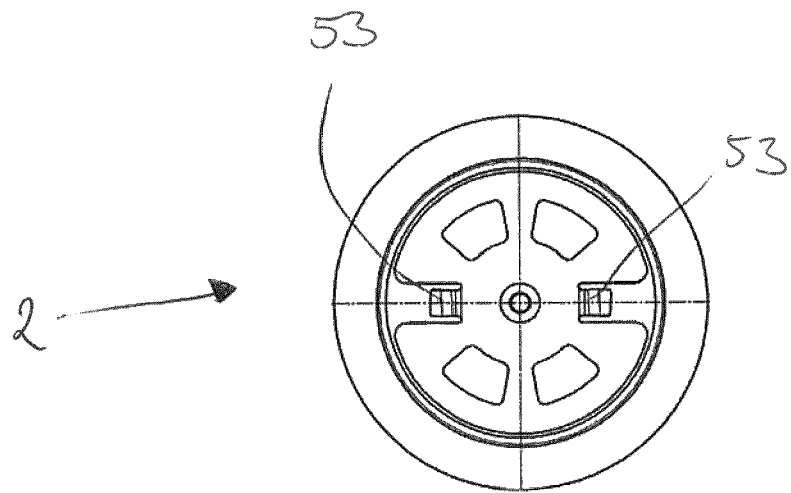
FIGS. 5a and 5b show an air spring device and a link for an air spring system according to a fifth embodiment of the present invention.
Figure 5B:
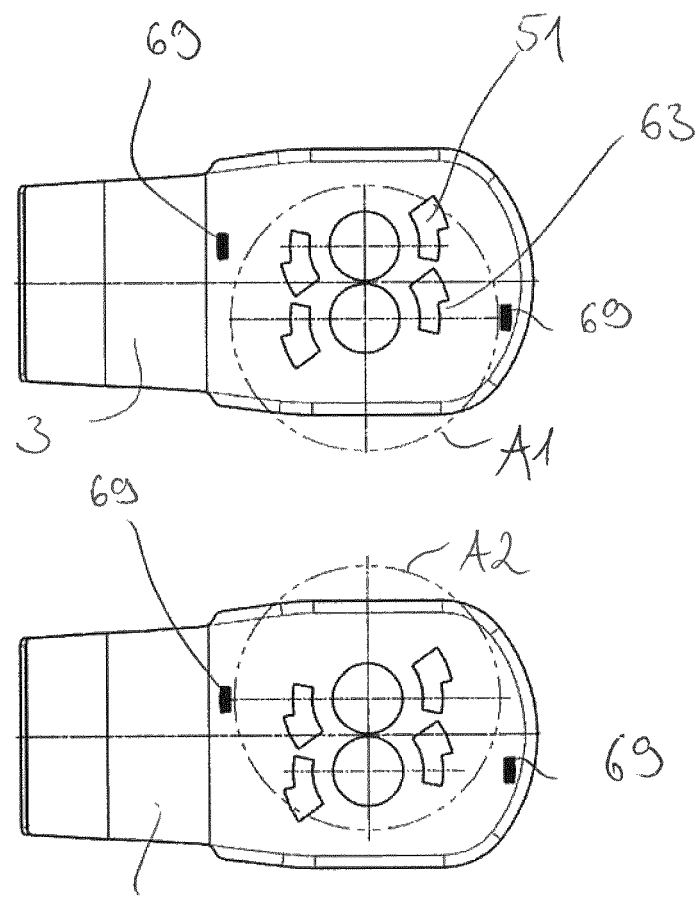
Figure 6A:
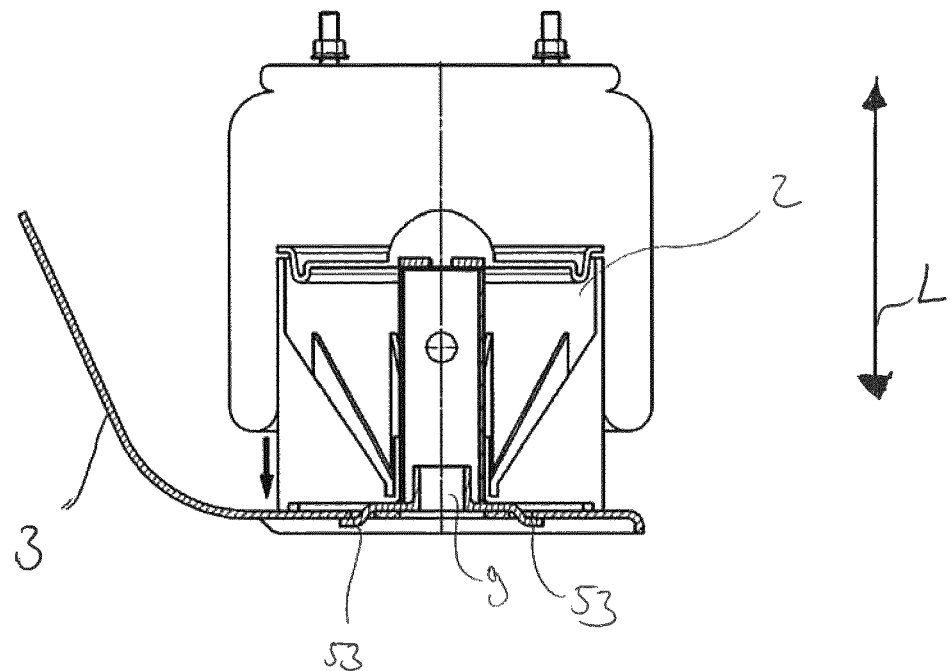
FIGS. 6a and 6b show the air spring system according to the fifth preferred embodiment of the present invention.
Figure 6B:
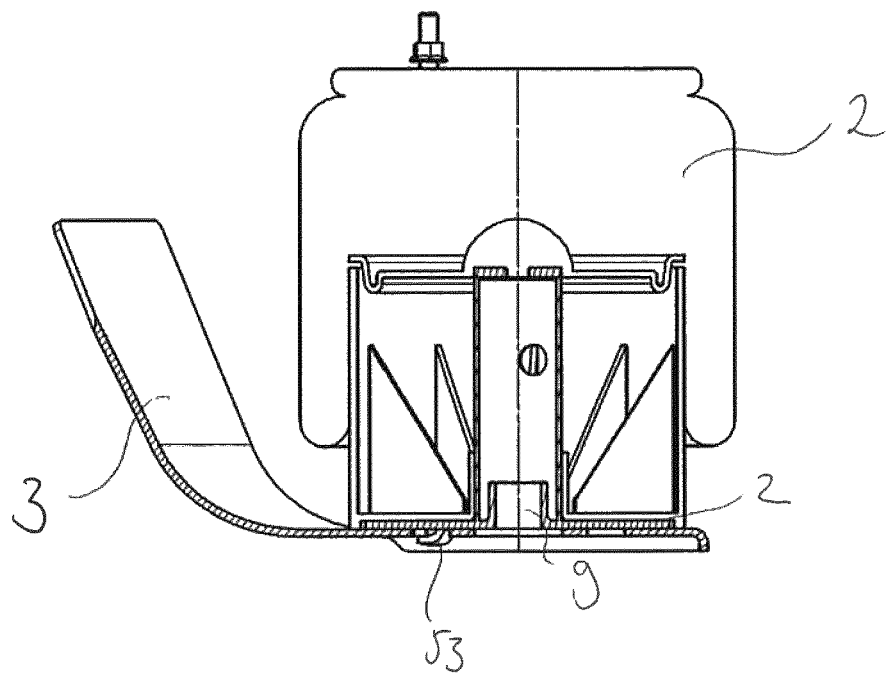

In FIGS. 5a and 5b, an air spring system 1 according to a fifth preferred embodiment is provided, wherein FIG. 5a illustrates a plan view of an air spring device 2, and FIG. 5b illustrates a plan view of a link 3. In particular, in the case of the illustrated air spring system 1, provision is made whereby the air spring device 2 and the link 3 are connected to one another by means of a bayonet fastening. For this purpose, the air spring device 2, at its end side, comprises hook elements 53, which preferably, in relation to an air spring device axis L predefined by the longitudinal extent of the air spring device 2, project radially outward and run in a manner offset in terms of height with respect to the bearing surface at which the air spring device 2 lies on the link 3. In this way, the hook elements 53 can engage through corresponding apertures in the link. The link 3 is designed such that a receiving region 51 defined by the aperture and a positive-locking region 63 are provided, and the hook elements 53 can be received in the receiving region 51 by means of a movement along the air spring device axis L and, subsequently, by means of rotation of the air spring device 2 and/or of the hook elements 53, the hook elements 53 are transferred into the positive-locking region 63, wherein the hook elements 53 interact in positively locking fashion with the positive-locking region 63 of the link 3 along a direction running parallel to the air spring device axis L. The fitting of the air spring device 2 onto the link 3 with a movement along the air spring device axis L (FIG. 6a) and the subsequent rotation of the air spring device 2 relative to the link 3 (FIG. 6b) are indicated in FIGS. 6a and 6b. As can furthermore be seen from FIG. 5, provision is preferably made whereby the link 3 provides a first attachment A1 and a second attachment A2 for the hook elements 53. In this way, it is advantageously possible for the air spring device 2 to be attached to the link 3 in two mutually offset orientations. Preferably, the air spring devices 2 can then be fixed in the first or second attachment in a manner dependent on the side of the vehicle at which the link 3 is mounted. Consequently, the links 3 can be produced with a first attachment A1 and a second attachment A2 on one production line, irrespective of their subsequent orientation on the vehicle.

Provision is furthermore made whereby the air spring device 2 and the link 3 comprise indication means 69 which indicate whether the air spring device 2 has reached the desired attached state. In this way, it is possible to prevent an air spring device 2 that has merely been placed on and the hook elements 53 of which are arranged in the receiving region 51 from giving the impression that it has been mounted. For example, the indication means 69 are arranged along a substantially horizontally running line with respect to one another when the air spring device 2 assumes its fully mounted state.

Figure 7:
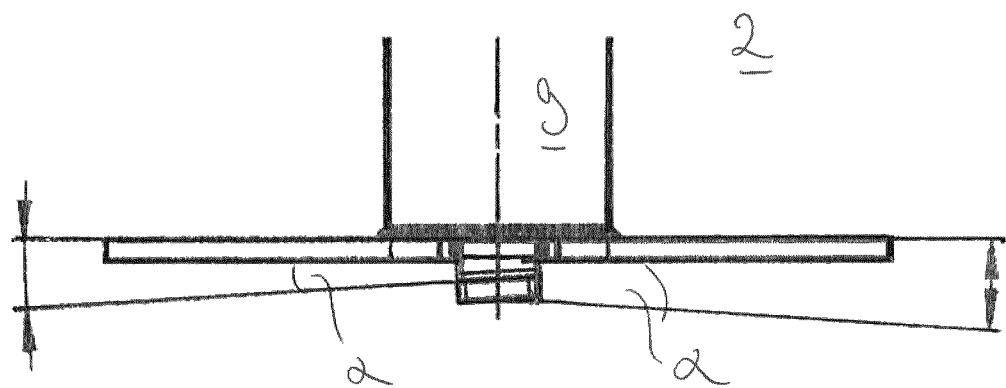
FIG. 7 shows tolerance compensation in the case of the air spring system according to the fifth preferred embodiment of the present invention.

FIG. 7 illustrates tolerance compensation in the case of the air spring system 1 according to the fifth preferred embodiment of the present invention. For this purpose, the hook element 53 has been rotated through an angle α, wherein the angle α assumes a value between 1.5° and 4.5, preferably between 0.8° and 2.2°, and particularly preferably between 1.3° and 1.8°. In this way, it is advantageously possible to ensure tolerance compensation and a clamping action.

In particular, the bayonet fastening described in FIGS. 5*a* to 7 is provided for the air spring system from FIGS. 1 to 4, such that the air spring device can be removed as easily and as quickly as possible from the link during the insertion of the closure device.

Figures 8A, 8B:
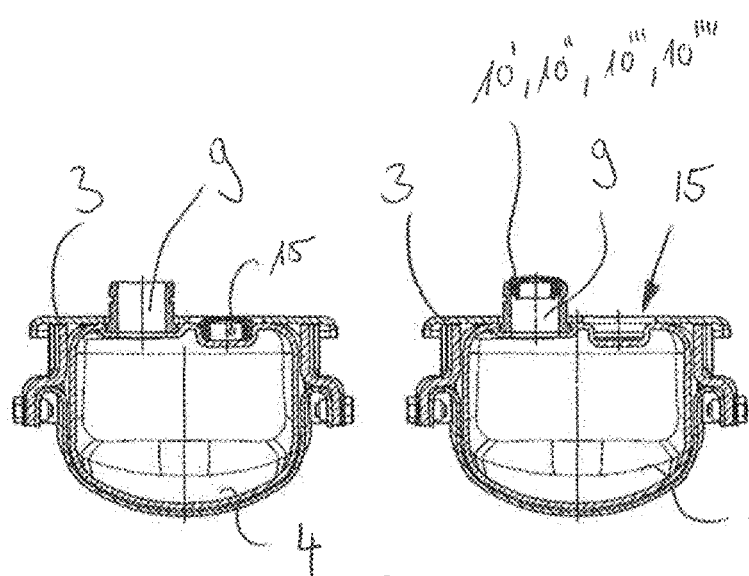
FIGS. 8a-8c show an air spring system according to another preferred embodiment of the present invention.
Figure 8C:
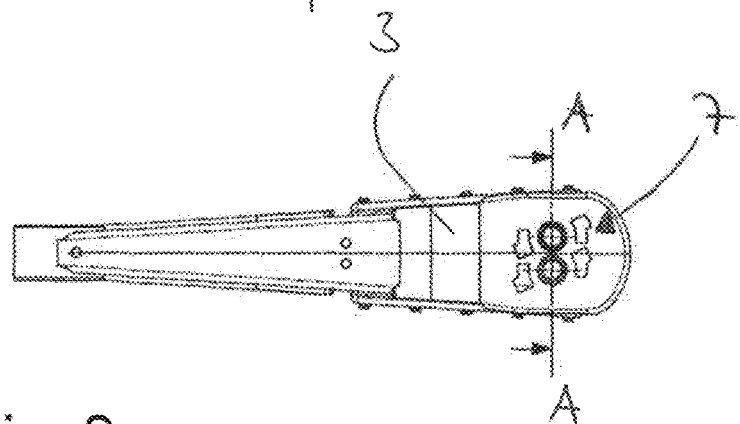

FIGS. 8*a*-8*c* illustrate an air spring system 1 according to a fourth preferred embodiment of the present invention. Here, a plan view of the link 3 is illustrated in FIG. 8*c*, whereas FIGS. 8*a* and 8*b* illustrate two sectional views along a line A-A in the interface region 7. In particular, provision is made whereby the link 3 and/or the auxiliary vessel 4 comprises a recess 15, preferably a depression-like recess 15, preferably on that side of the link 3 or of the auxiliary vessel 4 which faces toward a vehicle frame. Said recess 15 serves for the stowage or temporary storage of the closure device 10', 10", 10''', 10'''', such that the closure device 10', 10", 10''', 10'''' is provided in an easily accessible manner and close at hand on the link 3 when sealing of the fluid channel 9 is necessary. Here, FIG. 8*a* shows the closure device 10', 10", 10''', 10'''' during the temporary storage thereof in the recess 15, whereas, in FIG. 8*b*, the closure device 10', 10", 10''', 10'''' is sealing off the fluid channel 9. Here, provision is preferably made whereby the depth of the recess 15 is selected such that the temporarily stored closure device 10', 10", 10''', 10'''' protrudes relative to the link 3 in order to make it easier to take hold of the closure device 10', 10", 10''', 10''''.

REFERENCE DESIGNATIONS

1 Air spring system
2 Air spring device
3 Link
4 Auxiliary vessel
7 Interface region
8 Inner side of the auxiliary vessel
9 Fluid channel
10' Bolt
10" Closure system
10''' Closure cap
10'''' Further closure cap
15 Recess
21 Inner side of the fluid channel
23 Shoulder
24 Rounded end side
31 Filling element
32 Screw
33 Nut
34 Fixing element
35 Screw shank
36 Washer
41 Collar
51 Receiving region
53 Hook element
63 Positive-locking region
69 Indication means
81 Edge
D2 Second cross section
S Section plane
L Air spring device axis

The invention claimed is:

1. A use of a closure device with an air spring system, which has an auxiliary vessel and an air spring device configured to attach to a link, where in the event of a malfunction of the auxiliary vessel and/or of the air spring device which includes an air leak within the air spring system, the closure device seals off a fluid channel for gas exchange between the air spring device and the auxiliary vessel when the closure vessel is in an installed state, wherein the closure device is removable; and
   wherein the closure device at least one of comprises a bolt which seals off the air spring device by of one end of the bolt and is supported on the auxiliary vessel by another end of the bolt when in the installed state; and/or the closure device is configured such that the closure device has a first cross section in a section plane when the closure device is in a first state, and the closure device has a second cross section in the section plane enlarged in relation to the first cross section when in a second state, and the closure device comprises a deformable filling element and a fixing element wherein the filling element is transferred by the fixing element from the first state into the second state; and/or the closure device comprises a covering element that includes at least one of a closure cap and a plug, which is arranged, at an air spring device side, on an opening of the fluid channel between the air spring device and the auxiliary vessel.

2. The use as claimed in claim 1, wherein the closure device, in the installed state, is arranged in an interface region, in which the air spring device is attached to the link.

3. The use as claimed in claim 2, wherein the closure device, in the installed state, is fixable via positively locking and/or frictionally locking to the auxiliary vessel, to the link and/or to the air spring device.

4. The use as claimed in claim 3, wherein the closure device, in the installed state, at least partially fills the fluid channel.

5. The use as claimed in claim 4, wherein the closure device is configured to be fixed by the deformable filling element.

6. The use as claimed in claim 5, wherein a cross section of the closure device is configured to change at least in certain regions.

7. The use as claimed in claim 1, wherein the closure device, in the installed state, is fixable via positively locking and/or frictionally locking to the auxiliary vessel, to the link and/or to the air spring device.

8. The use as claimed in claim 1, wherein the closure device, in the installed state, at least partially fills the fluid channel.

9. The use as claimed in claim 1, wherein a cross section of the closure device is configured to change at least in certain regions.

10. A closure device configured for use with an air spring system having an auxiliary vessel and an air spring device configured to attach to a link, where in the event of a malfunction of the auxiliary vessel and/or of the air spring device the closure device seals off a fluid channel for gas exchange between the air spring device and the auxiliary vessel when in an installed state, the closure device:

comprising a bolt which seals off the air spring device by of one end thereof and is supported on the auxiliary vessel by another end thereof when in the installed state; and/or is configured such that the closure device has a first cross section in a section plane in a first state and the closure device has a second cross section enlarged in relation to the first cross section in the section plane in a second state, and comprises a deformable filling element and a fixing element wherein the filling element is transferred by the fixing element from the first state into the second state; and/or comprises covering element that includes at least one of a closure cap and a plug, which is arranged, at an air spring device side, on an opening of the fluid channel between the air spring device and the auxiliary vessel.

11. The closure device as claimed in claim 10, wherein the closure device, in the installed state, is arranged in an interface region, in which the air spring device is attached to the link.

12. The closure device as claimed in claim 11, wherein the closure device, in the installed state, is fixable via positively locking and/or frictionally locking to the auxiliary vessel, to the link and/or to the air spring device.

13. The closure device as claimed in claim 12, wherein the closure device, in the installed state, at least partially fills the fluid channel.

14. The closure device as claimed in claim 13, wherein the closure device is configured to be fixed by the deformable filling element.

15. The closure device as claimed in claim 14, wherein a cross section of the closure device is configured to change at least in certain regions.

16. The use as claimed in claim 10, wherein the closure device, in the installed state, is fixable via positively locking and/or frictionally locking to the auxiliary vessel, to the link and/or to the air spring device.

17. The use as claimed in claim 10, wherein the closure device, in the installed state, at least partially fills the fluid channel.

18. The use as claimed in claim 10 wherein a cross section of the closure device is configured to change at least in certain regions.

* * * * *